United States Patent [19]
Rauscher

[11] 3,882,524
[45] May 6, 1975

[54] APPARATUS FOR HOLDING A CAMERA READY FOR USE

[75] Inventor: Georg Rauscher, Stuttgart, Germany

[73] Assignee: Ingeborg Rauscher, Stuttgart, Germany

[22] Filed: Sept. 13, 1973

[21] Appl. No.: 396,714

[30] Foreign Application Priority Data
Oct. 3, 1972  Germany............................ 2248379

[52] U.S. Cl. ............................................. 354/293
[51] Int. Cl. .......................................... G03b 17/56
[58] Field of Search...................... 95/86; 354/293

[56] References Cited
UNITED STATES PATENTS

| | | | |
|---|---|---|---|
| 896,269 | 8/1908 | Birdwell.................................. | 95/86 |
| 2,370,611 | 2/1945 | DuMais................................. | 354/293 |
| 2,495,265 | 1/1950 | Krogman................................ | 95/86 |
| 2,636,822 | 4/1953 | Anderson............................... | 95/86 |

*Primary Examiner*—John M. Horan
*Attorney, Agent, or Firm*—Craig & Antonelli

[57] ABSTRACT

A body support for holding a motion picture camera in the use position at the eye level of a user is provided by an apparatus having a rod arranged to the side of the body of the user, on which is attached an adjustable holder for the motion picture camera directed forwardly and toward the center of the user's body. The rod is held by means of a hook-shaped suspending member hung over the user's shoulder and with a cross piece located at the level of the user's belt line, and whose ends rest against the user's body at the sides at two points. This body support leaves the chest and one shoulder of the user free, so that while taking pictures the chest can be moved for breathing and one arm can be moved for operating auxiliary equipment or for giving instructions, etc.

5 Claims, 3 Drawing Figures

APPARATUS FOR HOLDING A CAMERA READY FOR USE

The present invention relates to an apparatus for holding a camera, especially a motion picture camera equipped with a pistol grip, ready for use against the body of the person operating the camera.

The object of the invention is to design an apparatus of this type in such a manner that even a heavy camera can be reliably and steadily held, that extensive adjustment and adaptation possibilities are provided to the person operating the camera, and that a compact nonoperational position is provided.

According to the invention, this object is solved in that a holder supporting the camera is fixed vertically adjustable on a rod system, which extends to the side in front of the body of the person operating the camera longitudinally to the body and which engages a shoulder of the person with a suspending member on the one hand and is supported in at least two locations of the width of the body generally at the level of the belt line by means of a supporting member.

An apparatus according to the invention provides a holder which permits all required position setting possibilities, with the hands remaining free for operating and setting the camera.

In an advantageous development of the apparatus, the suspending member can comprise a generally semicircularly bent part forming one piece with the rod system, which provides a favourable shoulder rest and which grips the shoulder so as to avoid slipping.

The supporting member can be attached to the rod system in such a manner as to be able to pivot around the longitudinal axis of the rod system and be swivelled away and locked in the plane of the rod system with suspending member for compact transport or storage.

It is advantageous for the supporting member to comprise a member bent to the shape of a portion of a circle and having upwardly extending portions at both ends, of which at least one is pivotally attached to the rod system. This special form of the supporting member provides comfortable support above the belt line. Moreover, it permits the apparatus to be suspended from the left or right shoulder, as desired. And finally, it is possible to replace a supporting member with another having larger dimensions.

It is advantageous for the supporting member to comprise a bent rod, preferably a metal rod, while the rod system with suspending member comprises a tube, preferably a metal tube.

A rubber or plastic cap can be arranged at the free end of the supporting member to protect the clothing and for a secure hold.

To provide the articulated connection of the supporting member with the rod system, a cross slot can be arranged in the rod system in a simple manner, through which a setscrew extends, which engages the one of the two ends extending upwardly from the supporting member which is inserted into the rod system.

It is especially advantageous for the cross slot to be dimensioned in such a manner that it permits a swivel path of only less than 90° in such a manner that there is an acute angle between the supporting member and a plane extending through the rod system with suspending member. As a result, with the apparatus ready for use, the suspending member extends over the shoulder at an incline, with its free end being supported in the area of the spine, thus preventing the apparatus from slipping.

In addition to being vertically adjustable, the holder can also be hinged to the rod system in such a manner as to be able to pivot around the longitudinal axis of the rod system.

It is advantageous for the holder to comprise a rod of adjustable length, which extends upward at an incline from the rod system and whose extending end is angled horizontally for the arrangement of a supporting head for the camera.

The supporting head can be hinged to the holder in such a manner as to be able to swivel 90° around a horizontal axis located at right angles to the body; moreover, it can comprise two members which can be swivelled one relative to the other around a horizontal plane.

The above discussed and other objects, features and advantages of the present invention will become more apparent from the following description thereof, when taken in connection with the accompanying drawings, in which FIG. 1 shows an apparatus for holding a motion picture camera on a person;

Figure 1:
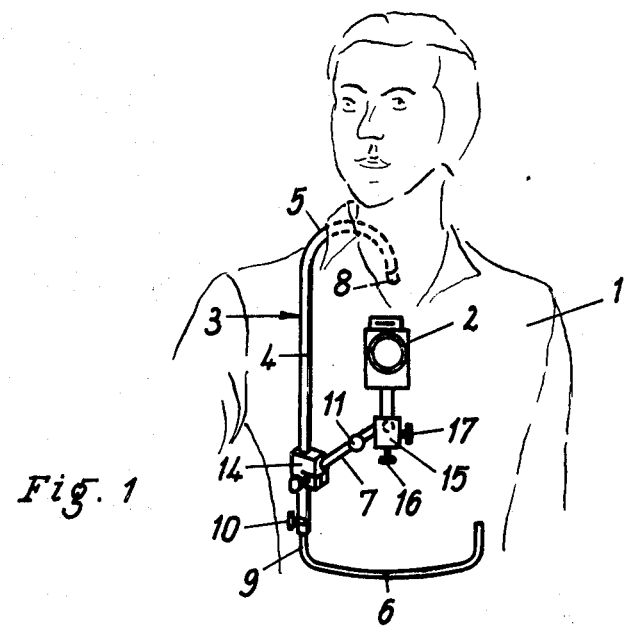

Referring now to the drawings, FIG. 1 shows a person 1 using an apparatus 3 for holding a motion picture camera 2, consisting primarily of a rod system 4, a suspending member 5, a supporting member 6 and a holder 7. Rod system 4 consists of a tube, which is arranged vertically and on the side of the chest of person 1 and which comprises a piece with suspending member 5. Suspending member 5 is bent into roughly a semicircle and engages the shoulder of the person 1 in such a manner that the free end of the suspending member, which is provided with a rubber or plastic cap 8, is located approximately in the area of the spine of the person 1. Hinged at the bottom end of rod system 4 is supporting member 6, which comprises solid material and is primarily bent to a portion of a circle, so that it is in a good contacting relationship with almost the entire width of the body of person 1 above the belt line and projecting at right angles from rod system 4. Supporting member 6 has upwardly extending members 9 on both sides. Supporting member 6 is detachably and pivotally connected with rod system 4 through one member 9 and a setscrew 10. The other free member 9 is required if rod system 4 is to be arranged on the other side of the body. The detachability of supporting member 6 from rod system 4 further permits a supporting member matched to the respective bodily proportions to be employed.

Holder 7 consists of two rods 12, 13, whose length can be altered by means of a setscrew 11, of which rod 12 is slidably hinged along rod system 4 by means of a fixable retaining member 14 and can be pivoted around rod system 4. When positioned for use, holder 7 extends forward from retaining member 14 and at an incline upward. The free end of rod 13 is angled forward and is horizontal. Arranged at this end is a supporting head 15 for the motion picture camera 2, which is held by means of a setscrew 16 which engages a corresponding thread in the motion picture camera. Supporting head 15 is designed so as to be able to be swivelled 90° relative to rod 13 and in an axis extending at right angles thereto, whereby this movability can be eliminated by tightening a setscrew 17.

Figure 2:
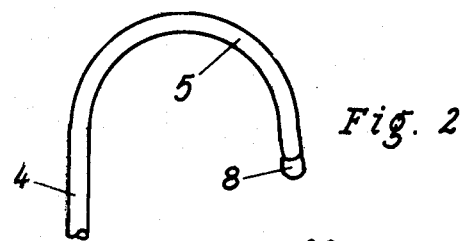
FIG. 2 shows the apparatus of FIG. 1 in a larger scale.
Figure 3:
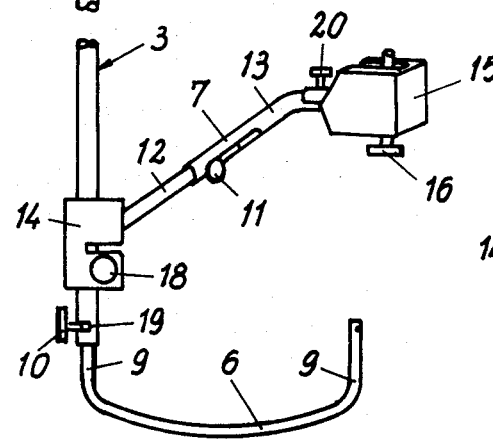
FIG. 3 shows a top view of the apparatus in the non-use position.
Figure 3:
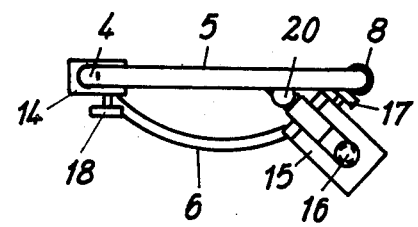

As can be seen more clearly from FIG. 2, retaining member 14 for holder 7 can be fixed by means of a setscrew 18. Setscrew 10 extends through a cross slot 19 in rod system 4 and into one member 9 at supporting member 6, so that, with setscrew 10 loosened, supporting member 6 can be swivelleld out of the use position and into the position shown in FIG. 3, a transport and storage position in a plane extending approximately through rod system 4 and suspending member 5. Rod 13 is designed as a tube and provided with a slot, through which setscrew 11 is screwed into rod 12, consisting of solid material. To provide pivotal hinging of supporting head 15 on rod 13, this rod is provided with a slot extending 90°, in which a setscrew 20 attached to supporting head 15 engages. It is advantageous to design retaining member 14 and supporting head 15 as die castings or as plastic members. It is advisable to employ aluminium or steel tubing and rods of these materials for the other members.

Obviously, many modifications and variations of the present invention are possible in the light of the above teachings. It should therefore be understood that within the scope of the appended claims, the invention may be practised otherwise than as specifically described.

Having thus fully disclosed my invention, what I claim is:

1. A support apparatus for holding a camera in front of a user consisting essentially of a rod system, said rod system comprising:
   a single longitudinally extending rod portion,
   a single suspending member connected to said rod portion at a first end thereof,
   a supporting member connected to said rod portion at a second end thereof, said supporting member being attached to the rod system in such a manner as to be able to pivot around the longitudinal axis of said rod portion, and
   a holder member connected to said rod portion intermediate of said first and second ends thereof,
   said rod system being supported on a body of a user by means of said single suspending member extending over only one shoulder of said user and by means of said supporting member resting against said body approximately at the belt line thereof, said supporting member resting aginst said body at only two points thereof, wherein said rod system is supported on said body such that said single longitudinally extending rod portion and said holder member are supported free from contact with the chest of said user, whereby said rod system is uneffected by breathing motions of said user,
   wherein said supporting member is formed of a rod having one end inserted into said second end of said single longitudinal rod portion and is retained by means of a setscrew extending through a cross slot in said second end.

2. An apparatus for holding a camera against the body of a person operating said camera, consisting of a rod system extending vertically to the side and in front of the body, to which is attached a holder extending at an incline toward the front and toward the center of the body and having means for attaching a camera, and with said rod system continuing upward to form a suspending member engaging the shoulder of the person in the manner of a hook, and continuing downward to be followed by a supporting member extending across the body and located almost at the level of the belt line, with its ends supported against the body of the person, in which said supporting member is attached to the rod system in such a manner as to be able to pivot around the longitudinal axis of said rod system, in which one end of a rod forming said supporting member is inserted into said rod system and retained by means of a setscrew extending through a cross slot in the tube, and in which the length of said cross slot is dimensioned in such a manner that there is always an angle of less than 90° between said supporting member and a plane extending through the rod system and suspending member.

3. A support apparatus for holding a camera in front of a user consisting essentially of a rod system, said rod system comprising:
   a single longitudinally extending rod portion,
   a single suspending member connected to said rod portion at a first end thereof,
   a supporting member connected to said rod portion at a second end thereof, and
   a holder member connected to said rod portion intermediate of said first and second ends thereof, said holder member being movably connected with said rod portion in the longitudinal direction and pivotally connected to said rod portion about the longitudinal axis,
   said rod system being supported on a body of a user by means of said single suspending member extending over only one shoulder of said user and by means of said supporting member resting against said body approximately at the belt line thereof, said supporting member resting against said body at only two points thereof, wherein said rod system is supported on said body such that said single longitudinally extending rod portion and said holder member are supported free from contact with the chest of said user, whereby said rod system is uneffected by breathing motions of said user,
   wherein said holder member comprises tubular members whose length is telescopically adjustable and which are attached to the rod system so as to extend upwardly at an incline, one of said tubular members having a horizontally angled free end with a supporting head for a camera.

4. An apparatus for holding a camera against the body of a person operating such camera, consisting of a rod system extending vertically to the side and in front of the body, to which is attached a holder extending at an incline toward the front and toward the center of the body and having means for attaching a camera, and with said rod system continuing upward to form a suspending member engaging the shoulder of the person in the manner of a hook, and continuing downward to be followed by a supporting member extending across the body and located almost at the level of the belt line, with its ends supported against the body of the person, in which said holder is vertically adjustable and attached so as to be able to pivot around the longitudinal axis of the rod system, and in which said holder comprises tubular members whose length is telescopically adjustable and which are attached to the rod system so as to extend upwardly at an incline, whose horizontally angle free end has a supporting head for hte camer, and in which said supporting head is attached to the holder in such a manner as to be able to pivot 90° around an axis extending horizontally and at right angles to the body of the user.

5. The apparatus according to claim 4, in which said supporting head comprises two members which can be swivelled one relative to the other around a horizontal axis.

* * * * *